US005647943A

United States Patent [19]
Kozlowski

[11] Patent Number: 5,647,943
[45] Date of Patent: Jul. 15, 1997

[54] METHOD OF BONDING A SEAT TRIM COVER TO A FOAM CUSHION UTILIZING AN ACCELERATED ADHESIVE ACTIVATOR

[75] Inventor: Eric F. Kozlowski, Rochester, Mich.

[73] Assignee: Lear Seating Corporation, Southfield, Mich.

[21] Appl. No.: 372,592

[22] Filed: Jan. 13, 1995

[51] Int. Cl.$^6$ ............................................. B32B 7/00
[52] U.S. Cl. ................... 156/310; 156/324.4; 428/317.1
[58] Field of Search ............................ 156/310, 324.4; 428/317.1

[56] References Cited

U.S. PATENT DOCUMENTS

| | | |
|---|---|---|
| 4,692,199 | 9/1987 | Kozlowski et al. ............... 264/546 |
| 4,925,513 | 5/1990 | Witzke et al. . |
| 5,234,523 | 8/1993 | Battreall ............................... 156/278 |

Primary Examiner—John J. Gallagher
Attorney, Agent, or Firm—Brooks & Kushman P.C.

[57] ABSTRACT

The method of making a cushion assembly uses a trim layer and cushion pad with an adhesive therebetween. The adhesive is a hot melt adhesive applied to the contoured surface of the cushion pad and reheated on the cushion pad prior to use thereof in the subject process. An adhesive activator is applied to the trim layer, which had been previously placed on a mold. The cushion pad and trim layer are compressed against one another with the adhesive and activator therebetween to bond the cushion pad and trim layer together.

14 Claims, 2 Drawing Sheets

METHOD OF BONDING A SEAT TRIM COVER TO A FOAM CUSHION UTILIZING AN ACCELERATED ADHESIVE ACTIVATOR

TECHNICAL FIELD

The subject invention relates to the securing of a trim layer, generally cloth or other upholstery material, to a cellular foam pad, and particularly of the type utilized for seating and back cushions in automotive seats.

BACKGROUND OF THE INVENTION

Various methods are utilized to secure and bond a trim layer to a foam pad. One such method developed by the assignee of the subject invention is disclosed in U.S. Pat. No. 4,692,199 issued Sep. 8, 1987 in the name of Kozlowski et al. The patent discloses a method of securing a fabric to foam pad which includes placing the fabric over a porous contoured mold, placing an air impervious adhesive film over the fabric layer, applying a vacuum to the mold to draw the adhesive film against the fabric layer to conform the fabric layer to the contours of the mold surface and eliminate any wrinkles, placing a similarly contoured foam pad in mating engagement with the adhesive film as it is held by the vacuum, compressing the foam pad against the mold by an upper perforated platen, and applying steam through the mold to heat and diffuse the adhesive film into the fabric layer and cellular foam pad to adhesively secure the two together. This process is very suitable for most materials. However, heating of the mold and platens may damage some types of upholstery layers, i.e., leather, making same undesirable.

U.S. Pat. No. 4,925,513 issued May 15, 1990 in the name of Witzke et al. discloses a method for manufacturing contoured seats which includes applying a heat activated adhesive layer to the upholstery, spraying an adhesive upon the foam cushion, and compressing the foam cushion against the upholstery and against the heat activated adhesive layer. The final step consists of applying heat to the heat activated adhesive layer to melt the adhesive and bond the upholstery and foam cushion together.

In any of these methods, it is necessary to decrease the processing time for bonding the trim layer to the foam pad, and eliminate the use of heat when using leather upholstery.

SUMMARY OF THE INVENTION AND ADVANTAGES

The invention includes a method of fabricating a cushion assembly comprising the steps of: applying a layer of liquid hot melt adhesive to a foam pad, the method characterized by applying a mist of adhesive activator to a trim layer, and compressing the foam pad against the trim layer with the hot melt adhesive adjacent the adhesive activator to bond the foam layer to the trim layer.

The advantages include the ability to use leather as a trim layer without damaging the leather by application of heat directly thereto. Furthermore, the process time for bonding the trim layer to the foam pad is decreased by the activator.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
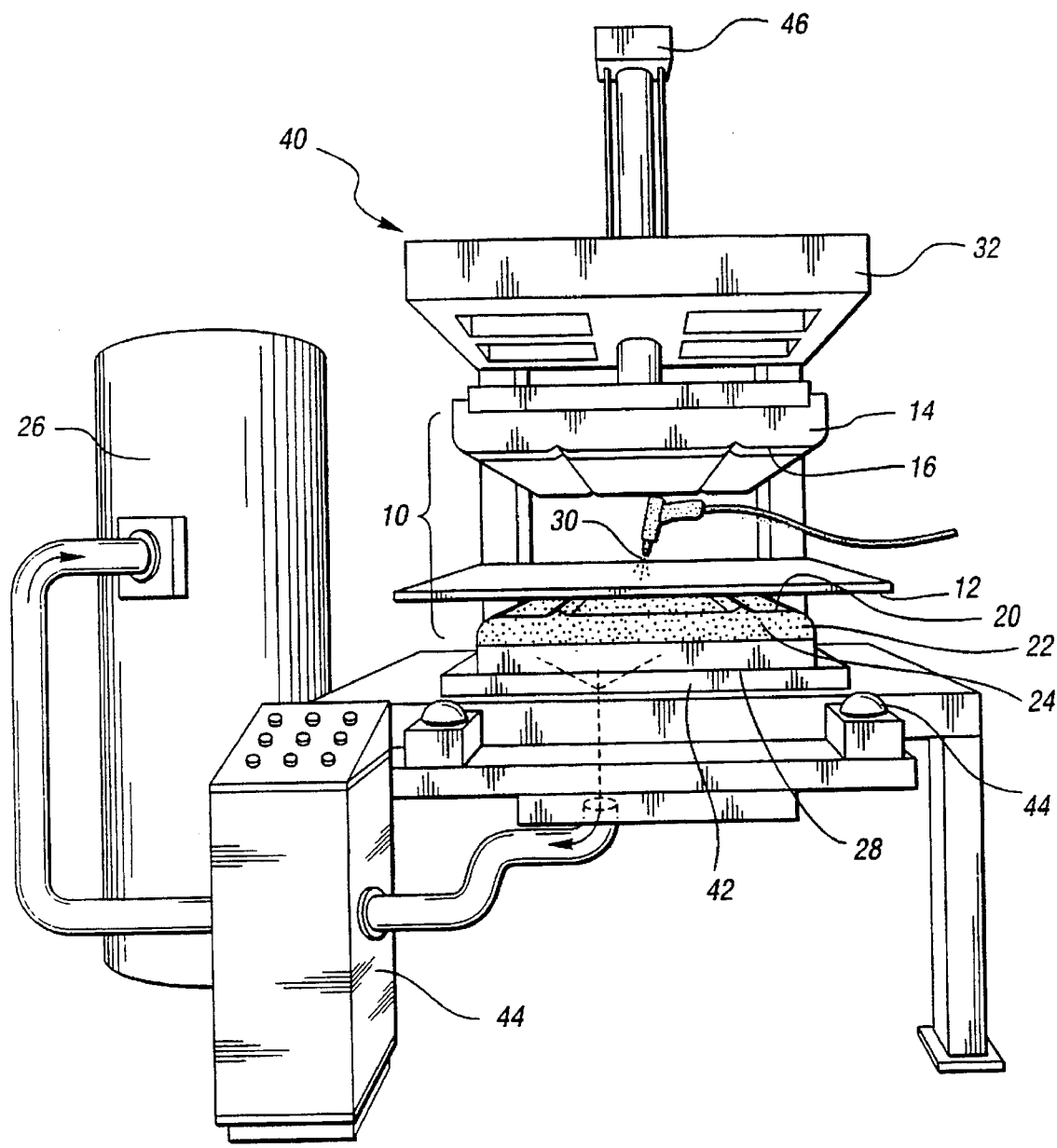
FIG. 1 is a perspective view of a preferred embodiment apparatus used in the method in accordance with the subject invention.
Figure 2:
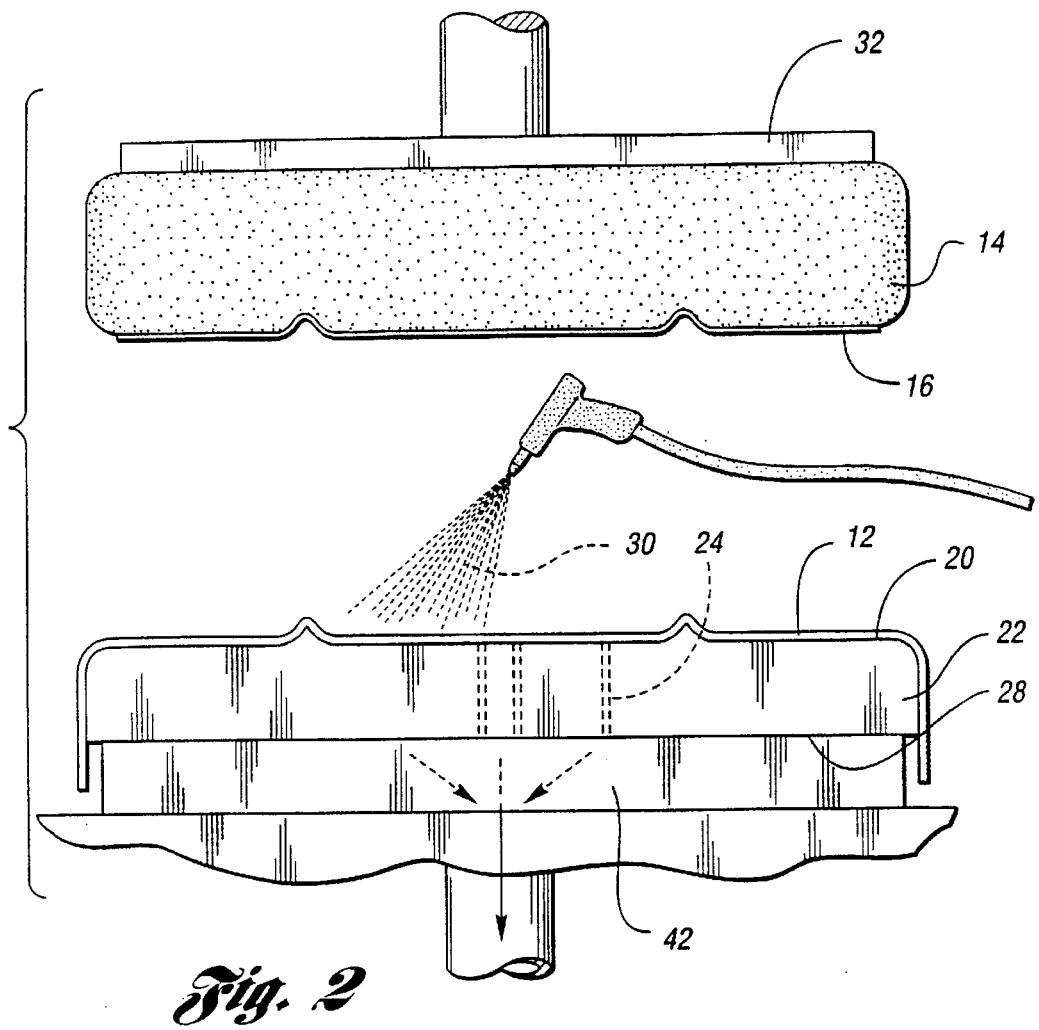
FIG. 2 is a schematic diagram showing the mist activator applied to the trim layer in a mold.
Figure 3:
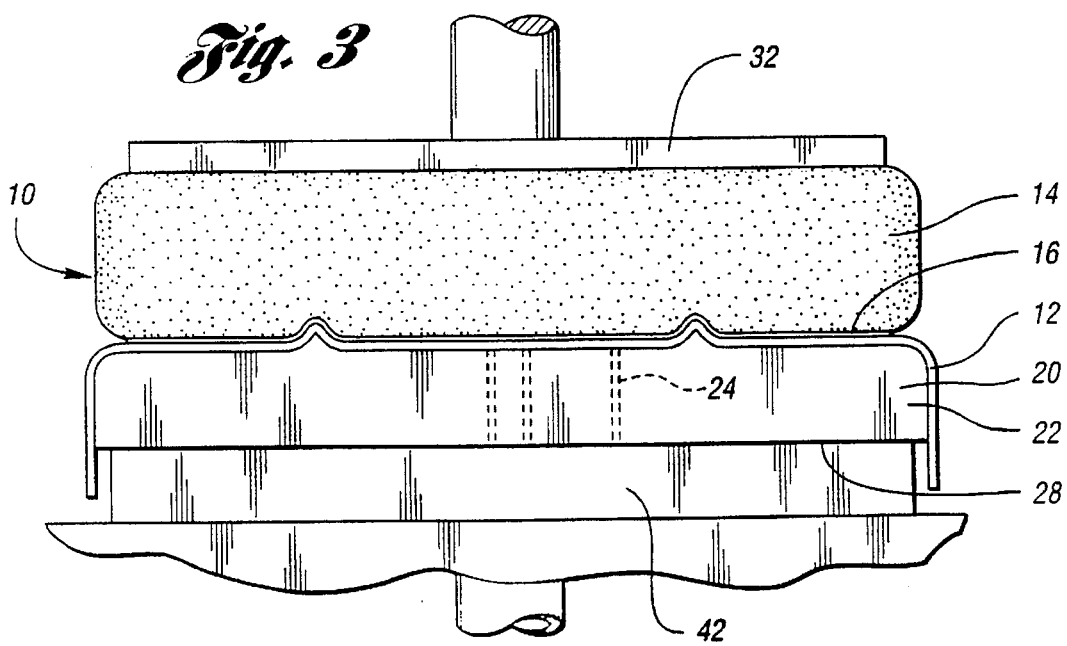
FIG. 3 is a schematic view of the foam pad placed over the trim layer and in compression therewith.

The invention is directed toward the method of fabricating a cushion assembly 10 with a trim layer 12 and a foam or cushion pad 14. In general, the resultant cushion assembly is utilized for vehicle seats, as commonly known in the art. However, such method may be applied to other types of seating arrangements or similar assemblies.

The method or process of fabricating the cushion assembly 10 includes the specific steps of applying a layer of liquid hot melt adhesive 16 to the contoured side of the foam pad 14. Such adhesive 16 may become partially or completely hardened on the foam pad 14 prior to use thereof in the subject process. However, prior to processing, and preferably within two hours of the original application of the liquid hot melt adhesive 16 to the foam pad 14, the hot melt adhesive 16 is reheated to soften or liquify same on the foam pad 14.

At the same time, the trim layer 12 is placed with its finished side down against a mold surface 20 of a porous mold 22. The porous mold 22 includes a plurality of apertures 24 therethrough for allowing air to pass. A vacuum 26 is applied to the back side 28 of the mold 22 to draw the vacuum through the mold 22 to the mold surface 20 to draw the trim layer 12 against the mold surface 20. The vacuum 26 draws the trim layer 12 against the mold surface 20 in complementing contour therewith. Thereafter, a mist of adhesive activator 30 is applied by spraying to the trim layer 12 on the mold 22. Thereafter, the foam pad 14 with the heated hot melt adhesive 16 is placed over the trim layer 12 with the hot melt adhesive 16 adjacent the adhesive activator 30. An upper platen 32 is moved against the foam pad 14 to compress the foam pad 14 against the trim layer 12 in the mold 22. Generally, the compression extends for at least eight minutes, after which time, the cushion assembly 10 with the trim layer 12 bonded to the foam pad 14 may be removed. Such time of compression may be decreased or increased as is necessary.

More specifically, the adhesive 16 may be of the hot melt type, such as that by National Starch and Chemical, No. 34-9001, which has a temperature at application of 245°+/−5° F. and a mass of 0.35+/−0.05 g/in 2. The activator 30 is generally comprised of ⅓ water, ⅓ $H_2O_2$ (3%-concentrated) ⅓ 2-propanol parts by volume. The unit for applying the hot melt adhesive may be that as provided by Hot Melt Technologies, Inc., Unit PF-305-15 MC. In order to reheat the hot melt adhesive 16, the foam pad 14 with the hardened adhesive 16 thereon may be placed in an oven to reheat the glue line to 250° F. Radiant-type heating is preferred.

It is desirable to reheat the hot melt adhesive 16 within two hours of the application to the foam pad 14 to approximately 250° F. Compression by the upper platen 32 is at a minimum of 1.0 inches +/−⅛ inch nominal compression for at 8 minutes (or preferably shorter, as necessary).

The process for making the cushion assembly 10 may be implemented through the mold apparatus 40 as set forth in U.S. Pat. No. 4,692,199 incorporated by reference herein, and as illustrated in FIG. 1. The general teachings will be described herein.

The mold apparatus 40 includes the mold 22 having the upper surface 20 with the apertures 24 therein to allow air to pass therethrough. The mold 22 presents a contoured mold surface 20. The trim layer 12 is contoured to the mold surface 20 by application of the vacuum 26. The trim layer 20 is generally pre-sewn to a finished contour. The foam pad 14 has the similar mating contour as the mold surface 20. A housing 42 is disposed below the mold 22 for providing an air-tight chamber and fluid communication with the passages or apertures 24 in the mold 22. The mold 22 is preferably made of porous material such as compacted granular particles and fibers adhesively secured together but through which fluids in the form of either gases or liquids may freely pass or flow. The mold is preferably made with metallic and carbide particles mixed with metallic needles and glass fibers in a binder, compacted and cured into a rigid porous structure having a relatively smooth surface. The mold 22 may alternatively be made of aluminum, die cast, ceramic or any other suitable mold material.

The vacuum 26 is connected to the housing 42 to supply a vacuum through the porous passages or apertures 24 in the mold 22. The vacuum 26 includes a vacuum pump and tank connected by fluid lines to the housing 42. A control circuit 44 is connected to the vacuum 26 to control operation thereof as required, as disclosed in the referenced patent, without application of heat or steam.

The upper platen 32 is suspended from a support structure 46 for vertical movement relative to the mold 22 for compressing the foam pad 14 against the trim layer 12 on the mold 22. A pneumatic cylinder includes a rod for moving the platen 32 vertically in relation to the mold 22. Similar apparatus 40 may be utilized to compress the trim layer 12 and foam pad 14 during assembly of the cushion assembly 10.

The foam pad 14 may be comprised of various different known material now utilized as cushion materials, such as the polyester or polyurethane-type. The foam pad 14 is pre-contoured to that of the finished seat surface and complimenting the contour of the mold surface 20 and trim layer 12. The trim layer 12 may also be of various materials or fabrics currently used as decorative layers for upholstered seats in automotive vehicles. The trim layer 12 is pre-sewn or formed by well known methods to have a contour of the final desired product. The process is particularly useful when utilizing leather or vinyl as a trim layer 12 which is air impervious such that the vacuum 26 may draw the trim layer 12 against the mold 22 and the leather trim layer 12 will not be destroyed by the direct application of heat to the mold as in the prior U.S. Pat. No. 4,692,199.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A method of fabricating a cushion assembly comprising the steps of:

applying a layer of hot melt thermosetting adhesive to a foam pad;

the method characterized by applying a mist of adhesive activator to a trim layer and compressing the foam pad against the trim layer in a mold with the adhesive adjacent the activator to bond the foam pad to the trim layer.

2. A method as set forth in claim 1 further including allowing the hot melt thermosetting adhesive to partially harden on the foam pad prior to compressing the foam pad against the trim layer.

3. A method as set forth in claim 2 further including reheating the hot melt adhesive on the foam pad within a predetermined time after the partial hardening to re-soften the hot melt adhesive to a predetermined uniform temperature prior to placing the foam pad against the trim layer.

4. A method as set forth in claim 3 further including placing the trim layer on a contoured mold surface of the mold.

5. A method as set forth in claim 4 further including applying a vacuum through the mold to draw the trim layer against and complementing the mold surface.

6. A method as set forth in claim 5 further including applying the mist of adhesive activator on the trim layer drawn against the mold surface.

7. A method as set forth in claim 6 further including placing the foam pad with the reheated hot melt adhesive against the drawn trim layer on the mold surface.

8. A method as set forth in claim 7 further including applying a pressure platen against the foam pad and moving the pressure platen and mold relative to one another to compress the foam pad and trim layer therebetween for a predetermined length of time for curing the hot melt adhesive.

9. A method of fabricating a cushion assembly comprising the steps of:

placing a trim layer on a mold surface:

applying a vacuum through the mold surface to draw the trim layer against the mold surface;

providing a foam pad;

separately and independently providing a thermosetting adhesive layer and an adhesive activator between the foam pad and the trim layer;

compressing the foam pad against the trim layer with the adhesive layer and the adhesive activator between the foam pad and trim layer to cure the adhesive and accelerate the bonding of the foam pad to the trim layer.

10. A method as set forth in claim 9 further including applying a layer of hot melt thermosetting adhesive to the foam pad.

11. A method as set forth in claim 10 further including applying a mist of the adhesive activator to the trim layer.

12. A method as set forth in claim 11 further including allowing the hot melt thermosetting adhesive to partially harden on the foam pad prior to compressing the foam pad against the trim layer.

13. A method as set forth in claim 12 further including reheating the hot melt adhesive on the foam pad within a predetermined time after the partial hardening to re-soften the adhesive to a predetermined uniform temperature prior to placing the foam pad against the trim layer.

14. A method as set forth in claim 9 further including the adhesive activator comprising a solution of water, alcohol and peroxide.

* * * * *